United States Patent
Groves et al.

(10) Patent No.: US 8,250,535 B2
(45) Date of Patent: Aug. 21, 2012

(54) MAINTAINING VITALITY OF DATA IN SAFETY-CRITICAL SYSTEMS

(75) Inventors: Robert B. Groves, Manassas, VA (US); Richard A. Allshouse, Manassas, VA (US); Michael Lamana, Warrenton, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 1016 days.

(21) Appl. No.: 12/207,244

(22) Filed: Sep. 9, 2008

(65) Prior Publication Data

US 2010/0064294 A1 Mar. 11, 2010

(51) Int. Cl.
*G06F 9/44* (2006.01)
*G06F 9/45* (2006.01)

(52) U.S. Cl. .................. 717/121; 717/104; 717/136
(58) Field of Classification Search .................. None
See application file for complete search history.

(56) References Cited

U.S. PATENT DOCUMENTS

| | | | |
|---|---|---|---|
| 6,851,105 B1* | 2/2005 | Coad et al. | 717/106 |
| 8,176,151 B2* | 5/2012 | Drake et al. | 717/104 |
| 2002/0100017 A1* | 7/2002 | Grier et al. | 717/121 |
| 2004/0002960 A1* | 1/2004 | Drake et al. | 707/3 |
| 2005/0114846 A1* | 5/2005 | Banks et al. | 717/136 |
| 2005/0198057 A1* | 9/2005 | Antoch | 707/102 |
| 2005/0222969 A1* | 10/2005 | Yip et al. | 707/1 |
| 2008/0082959 A1* | 4/2008 | Fowler | 717/104 |
| 2008/0155500 A1* | 6/2008 | Richmond | 717/109 |
| 2009/0132549 A1* | 5/2009 | Lee et al. | 707/10 |
| 2009/0288068 A1* | 11/2009 | Gunsel et al. | 717/116 |
| 2010/0050109 A1* | 2/2010 | Kaliki et al. | 715/780 |
| 2010/0094766 A1* | 4/2010 | Li et al. | 717/136 |
| 2010/0094816 A1* | 4/2010 | Groves et al. | 707/697 |
| 2010/0125830 A1* | 5/2010 | Lamana | 717/121 |
| 2011/0145789 A1* | 6/2011 | Rasch et al. | 717/121 |
| 2012/0089960 A1* | 4/2012 | Medvidovic et al. | 717/104 |
| 2012/0124553 A1* | 5/2012 | Eschenroeder et al. | 717/121 |

OTHER PUBLICATIONS

VMware, "VMware vCenter Configuration Manager", 2010 VMware, Inc., pp. 1-2; <http://www.vmware.com/files/pdf/VMware_vCenter_Configuration_Manager_Datasheet_English.pdf>.*
Tim Kelly, "Using Software Architecture Techniques to Support the Modular Certification of Safety-Critical Systems", 2006 ACM,SCS'06, pp. 53-65; <http://dl.acm.org/citation.cfm?id=1274236.1274244&coll=DL&dl=GUIDE&CFID=86837784&CFTOKEN=66354725.*
Gohil et al., "Redundancy Management and Synchronization in Avionics Communication Products", 2011 IEEE, C3-1-C3-8; <http://ieeexplore.ieee.org/stamp/stamp.jsp?tp=&arnumber=5935266>.*

* cited by examiner

*Primary Examiner* — Thuy Dao
*Assistant Examiner* — Ben Wang
(74) *Attorney, Agent, or Firm* — Kaplan Breyer Schwarz & Ottesen, LLP

(57) ABSTRACT

A mechanism for maintaining configuration or other vital data outside of source code is disclosed. In accordance with the illustrative embodiment of the present invention, a data manager software component serves as an interface between an external configuration data store and one or more applications, processes, and threads. In contrast with techniques of the prior art, the illustrative embodiment does not suffer from the risk of undetected corruption of vital data, and therefore is especially advantageous in safety-critical systems.

20 Claims, 6 Drawing Sheets

Figure 5

```
public class DataManager { private static final DataManager INSTANCE = new DataManager();
    private static final InputStream XML = new FileInputStream("<XmlFileName>");
    private static Properties configData = new Properties();

static {
        loadConfigValues();
    } private DataManager() {
    } public static final DataManager getInstance() {
        return INSTANCE;
    } public String getConfigValue(String configDatumName) {
        return configData.getProperty(configDatumName);
    } public String getConfigValue(String configDatumName, String default) {
        return configData.getProperty(configDatumName, default);
    } private loadConfigValues {
        configData.loadFromXML(XML);
    }

}
```

```
DataManager dm = DataManager.getInstance();

String s = dm.getConfigValue("North_light_red_time");
int northRedSecs = Integer.parseInt(s);

s = dm.getConfigValue("East_light_red_time", "0");
int eastRedSecs = Integer.parseInt(s);
```

MAINTAINING VITALITY OF DATA IN SAFETY-CRITICAL SYSTEMS

FIELD OF THE INVENTION

The present invention relates to computer software in general, and, more particularly, to safety-critical systems.

BACKGROUND OF THE INVENTION

Software systems typically maintain configuration data outside of the source code, as opposed to hard-coded within source code, in order to provide maximum flexibility and extensibility. This approach, however, introduces the risk that configuration data might be corrupted or changed in some other unwanted fashion. Moreover, in a system that supports concurrency, there is the risk that two or more applications, processes, threads, etc. will not have a consistent view of the configuration data.

In a safety-critical system, configuration data is considered vital, and the foregoing risks are unacceptable. What is needed, therefore, is a mechanism that offers the advantages of maintaining configuration data outside of source code, but that guarantees that (1) no corruption of configuration data occurs prior to initialization, and (2) any change to configuration data that occurs during execution is detected.

SUMMARY OF THE INVENTION

The present invention provides a mechanism in which a safety-critical system can maintain configuration or other vital data outside of source code, without the potential risks associated with techniques of the prior art. In particular, a data manager software component is employed that serves as an interface between an external configuration data store and one or more applications, processes, and threads of the safety-critical system. In accordance with the illustrative embodiment, the data manager component is an object class that implements the Singleton design pattern, which restricts instantiation of the class to a single object. In accordance with the Singleton pattern, the data manager class has a public method getInstance( ) that provides access to the single object, and a constructor that is declared private, thereby preventing the creation of additional objects from outside the class.

In accordance with the illustrative embodiment, the data manager class also comprises code for obtaining configuration data from an external eXtensible Markup Language (XML) document, where the code is inaccessible from outside of the class. In addition, the data manager class comprises one or more public methods for accessing values of the configuration data, but lacks any public methods for updating the configuration data.

The illustrative embodiment comprises: a software component for maintaining one or more configuration data across one or more processes, threads, and applications, the software component comprising: code for obtaining one or more values for the configuration data from outside the software component; one or more public methods for accessing values of the configuration data; and a method that returns a singleton instance of the software component; wherein the code is inaccessible from outside of the software component; and wherein the code is the only means in the software component for obtaining a value for the configuration data; and wherein the software component has no public method for updating a value of the configuration data; and wherein the software component has no public constructor.

BRIEF DESCRIPTION OF THE DRAWINGS

FIG. 5 depicts illustrative code for data manager 101, as shown in FIG. 1, in accordance with the illustrative embodiment of the present invention.

FIG. 6 depicts illustrative code for application 103-$i$, as shown in FIG. 1, in accordance with the illustrative embodiment of the present invention.

DETAILED DESCRIPTION

Figure 1:
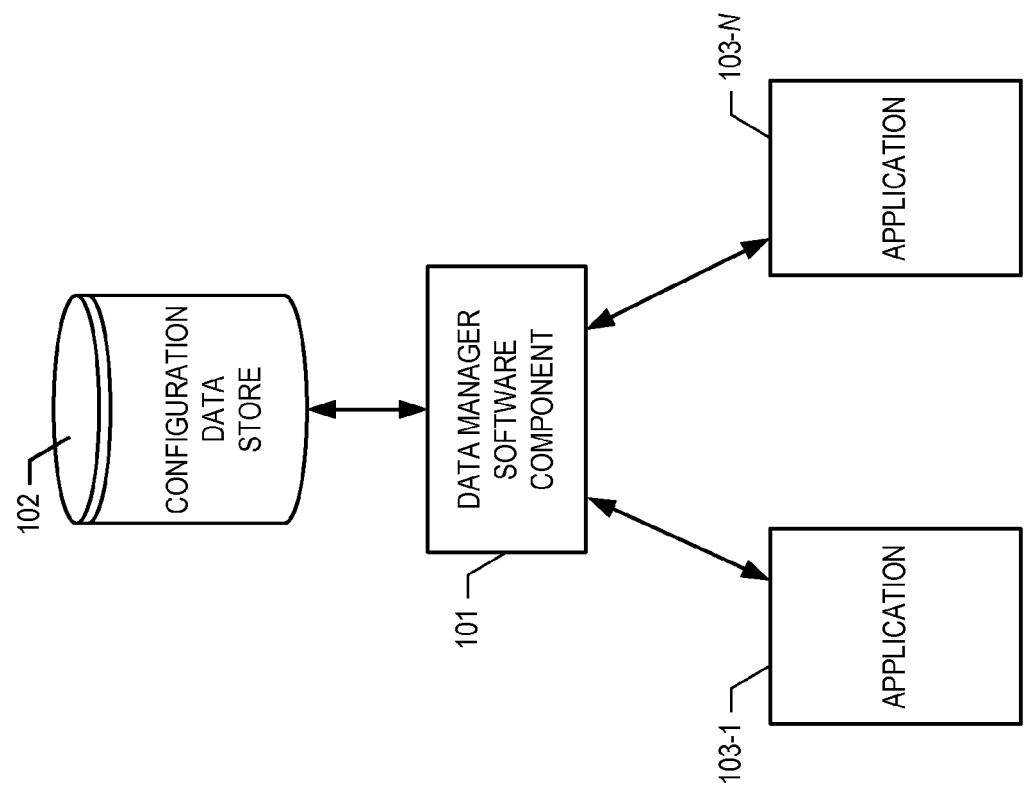
FIG. 1 depicts a schematic diagram of the salient elements of a safety-critical software system, in accordance with the illustrative embodiment of the present invention.

FIG. 1 depicts a schematic diagram of the salient elements of safety-critical software system 100, in accordance with the illustrative embodiment of the present invention. As shown in FIG. 1, software system 100 comprises data manager 101, configuration data store 102, and applications 103-1 through 103-N, where N is a positive integer.

Data manager 101 is a software component that is capable of obtaining configuration data values from configuration data store 102, and of controlling access to these values, and is described in detail below and with respect to FIG. 5.

Configuration data store 102 is one of a database, an unstructured file system, a data structure stored in main memory, etc. that is capable of storing configuration data values. In accordance with the illustrative embodiment, configuration data store 102 stores the configuration data values in an eXtensible Markup Language (XML) document, as is described below and with respect to FIG. 2.

Each of applications 103-1 through 103-N, where N is a positive integer, is a computer program that performs a well-defined set of functions in safety-critical system 100, as is well-known in the art.

Figure 2:
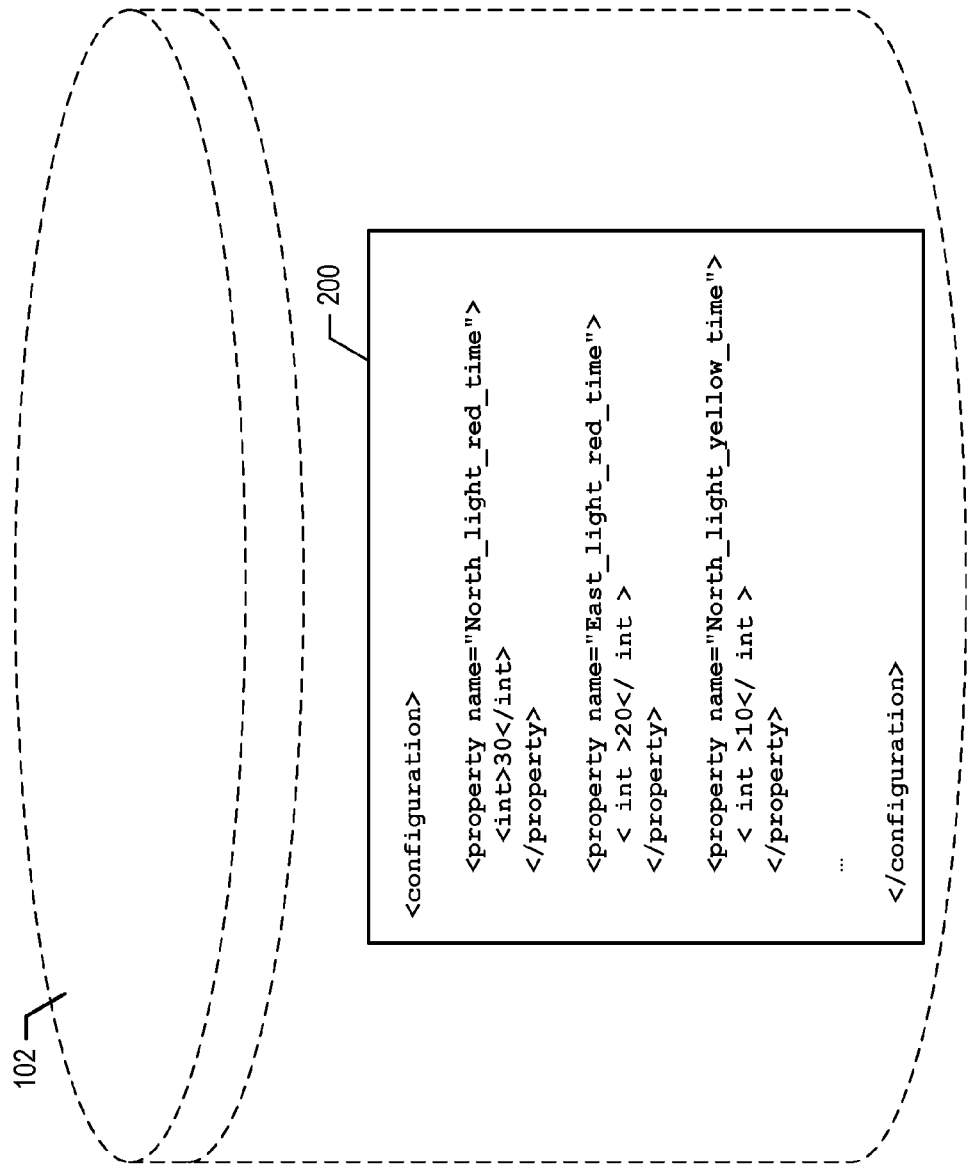
FIG. 2 depicts illustrative contents of configuration data store 102, as shown in FIG. 1, in accordance with the illustrative embodiment of the present invention.

FIG. 2 depicts illustrative contents of configuration data store 102, in accordance with the illustrative embodiment of the present invention. In the illustrative embodiment, configuration data values are stored in an eXtensible Markup Language (XML) document, a type of document well-known in the art. FIG. 2 depicts illustrative XML document 200, in which the configuration data are represented as a set of properties and values.

As will be appreciated by those skilled in the art, in some other embodiments of the present invention, configuration data values might be stored in an alternative fashion in XML document 200, while in still other embodiments, configuration data values might be stored in a different kind of document or data structure, rather than an XML document. In any case, it will be clear to those skilled in the art, after reading this disclosure, how to make and use such alternative embodiments of the present invention.

Figure 3:
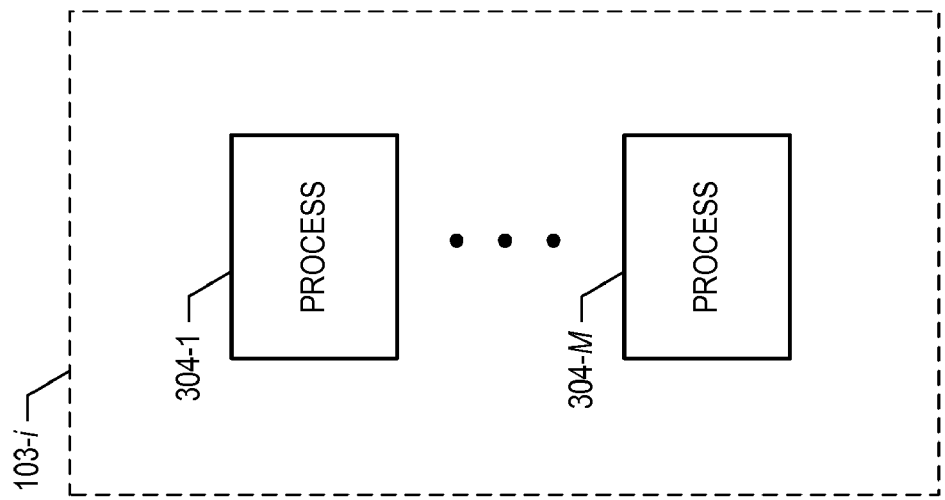
FIG. 3 depicts a conceptual representation of application 103-$i$ during its execution, in accordance with the illustrative embodiment of the present invention.

FIG. 3 depicts a conceptual representation of application 103-$i$ during its execution, where i is an integer between 1 and N inclusive, in accordance with the illustrative embodiment of the present invention. As shown in FIG. 3, application 103-$i$ comprises processes 304-1 through 304-M, where M is a positive integer.

Each process 304-$j$, where j is an integer between 1 and M inclusive, is an instance of a computer program that is spawned during the execution of application 103-$i$, as is well-known in the art.

Figure 4:
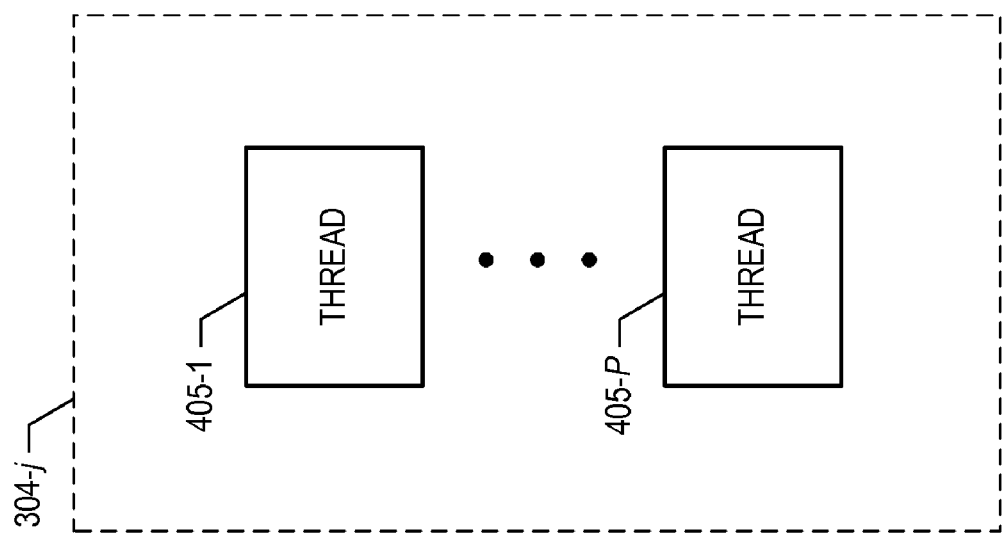
FIG. 4 depicts a conceptual representation of process 304-$j$ during its execution, in accordance with the illustrative embodiment of the present invention.

FIG. 4 depicts a conceptual representation of process 304-$j$ during its execution, where j is an integer between 1 and M inclusive, in accordance with the illustrative embodiment of the present invention. As shown in FIG. 4, process 304-$j$ comprises threads 405-1 through 405-P, where P is a positive integer.

Each thread 405-$k$, where k is an integer between 1 and P inclusive, is a thread of execution within process 304-$j$, as is well-known in the art.

FIG. 5 depicts illustrative code for data manager 101, in accordance with the illustrative embodiment of the present invention. In accordance with the illustrative embodiment, data manager 101 is a single object class called DataManager. As shown in FIG. 5, class DataManager implements the Singleton design pattern, which restricts instantiation of the class to a single object. In particular, class DataManager has a public method getInstance( ) that provides access to the single object, and restricts external access to the class constructor by declaring it private, thereby preventing the creation of additional objects from outside the class.

The configuration data values are stored in a property list data structure called configData. Class DataManager has two public methods getConfigValue( ) for accessing the configuration data values: one accepts the datum name as its single input parameter, and the other accepts the datum name and a default value. In addition, class DataManager has a private method loadConfigValues( ) that reads the configuration data values from XML document 200; this method is invoked by a static initialization block that is automatically executed when the class is loaded. Because data structure configData is declared private, and because the code for reading the configuration data values is encapsulated in a private method, the configuration data values cannot be directly accessed or changed by any of applications 103-1 through 103-N, processes 304-1 through 304-M, or threads 405-1 through 405-P.

As will be appreciated by those skilled in the art, in some other embodiments of the present invention, data manager 101 might comprise code that is specified in some other object-oriented programming language (e.g., C#, Smalltalk, etc.), or might comprise a plurality of object classes rather than a single object class, or might in fact be specified in a programming language that is not object-oriented (e.g., C, Perl, etc.). In any case, it will be clear to those skilled in the art, after reading this disclosure, how to make and use such alternative embodiments of data manager 101.

FIG. 6 depicts illustrative code for application 103-$i$, where i is an integer between 1 and N inclusive, in accordance with the illustrative embodiment of the present invention. As shown in FIG. 6, the singleton DataManager object is obtained by the public getInstance( ) method, and the configuration data values are obtained by the public getConfigValue( ) methods. As will be appreciated by those skilled in the art, in some embodiments of the present invention, the code depicted in FIG. 6 might belong to one of processes 304-1 through 304-M spawned by application 103-$i$, while in some other embodiments, the code of application 103-$i$ depicted in FIG. 6 might not belong to any of these processes. Moreover, when the code depicted in FIG. 6 does belong to one of processes 304-1 through 304-M (say process 304-$j$), then in some embodiments of the present invention this code might belong to one of threads 405-1 through 405-P, while in some other embodiments, the code of process 304-$j$ depicted in FIG. 6 might not belong to any of these threads.

As will be appreciated by those skilled in the art, the specification of safety-critical system 100 as described above and with respect to FIGS. 1 through 6 guarantees that the values of the configuration data will not be corrupted prior to initialization, and that during execution, any corruption or changes to configuration data values are automatically detected. Consequently, safety-critical software system 100 is said to maintain the vitality of the configuration data. As will be further appreciated by those skilled in the art, in some other embodiments of the present invention, the techniques of the illustrative embodiment might be employed for maintaining the vitality of other kinds of data (i.e., data that might not be related to system configuration).

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A software component, stored in a computer-readable memory, for maintaining one or more configuration data across one or more processes, threads, and applications, said software component comprising:
   a static initialization block that is executed when the software component is loaded;
   code for obtaining one or more values of said configuration data from a data store that is outside said software component, wherein said code is invoked by said static initialization block, thereby initializing said software component with said one or more obtained values of said configuration data;
   one or more public methods for accessing values of said configuration data; and
   a method that returns a singleton instance of said software component;
   wherein said code is inaccessible from outside of said software component; and
   wherein said code is the only way that said software component obtains a value of said configuration data; and
   wherein said software component has no public method for updating a value of said configuration data; and
   wherein said software component has no public constructor; and
   wherein said data store is outside the source code for said software component.

2. The software component of claim 1 wherein said configuration data is stored in an eXtensible Markup Language file that is in said data store.

3. The software component of claim 1 wherein said software component does not require recompilation when there is a change in a value of said configuration data.

4. The software component of claim 1 wherein said processes, said threads, and said applications do not require recompilation when there is a change in a value of said configuration data.

5. The software component of claim 1 wherein said software component periodically checks that the values of said configuration data have not been altered.

6. The software component of claim 1 wherein said software component consists solely of standard constructs of an object-oriented programming language.

7. The software component of claim 5 wherein said object-oriented programming language is C++, and wherein said software component is a C++ class.

8. A method of executing a computer program that is stored in a computer-readable medium, the method comprising:
- invoking, when a class is loaded, by a static initialization block therein, a private method that obtains one or more values of vital data from a data store that is outside said class, thereby initializing said class with said one or more obtained values of said vital data;
- invoking a first public method of said class that returns a singleton instance of said class; and
- invoking a second public method of said singleton instance that returns a value of said one or more obtained values of said vital data;
- wherein said private method is inaccessible from outside of said class; and
- wherein said private method is the only way that said class obtains a value of said vital data from said outside data store; and
- wherein said class has no public method for updating said one or more obtained values of said vital data; and
- wherein said class has no public constructor; and
- wherein said data store is outside the source code of the computer program.

9. The method of claim 8 wherein said vital data is stored in an eXtensible Markup Language file in said data store.

10. The method of claim 8 wherein said class does not require recompilation when there is a change in a value of said vital data.

11. The method of claim 8 wherein said first public method and said second public method are invoked in the computer program, and wherein said computer program does not require recompilation when there is a change in a value of said vital data.

12. The method of claim 8 wherein said class consists solely of standard constructs of an object-oriented programming language.

13. The method of claim 12 wherein said object-oriented programming language is C++.

14. A method of accessing vital data by one or more software processes that are stored in a computer-readable medium, the method comprising:
- invoking, when a class is loaded, by a static initialization block therein, a private method that obtains one or more values of said vital data from a data store that is outside said class, thereby initializing said class with said one or more obtained values of said vital data;
- invoking in a first process a first public method of said class that returns a singleton instance of said class;
- invoking in said first process a second public method of said singleton instance that returns a value of said one or more obtained values of said vital data;
- invoking in a second process said first public method of said class; and
- invoking in said second process said second public method of said singleton instance;
- wherein said private method is inaccessible from outside of said class; and
- wherein said private method is the only way that said class obtains a value of said vital data from said outside data store; and
- wherein said class has no public method for updating said one or more obtained values of said vital data; and
- wherein said class has no public constructor; and
- wherein said data store of vital data is outside the source code of said software processes.

15. The method of claim 14 wherein said vital data is stored in an eXtensible Markup Language file in said data store.

16. The method of claim 14 wherein said class does not require recompilation when there is a change in a value of said vital data.

17. The method of claim 14 wherein the code for said first process and for said second process does not require recompilation when there is a change in a value of said vital data.

18. The method of claim 14 wherein said first process and said second process execute in a safety-critical system.

19. The method of claim 14 wherein said class consists solely of standard constructs of an object-oriented programming language.

20. The method of claim 19 wherein said object-oriented programming language is C++.

* * * * *